Figure 1:
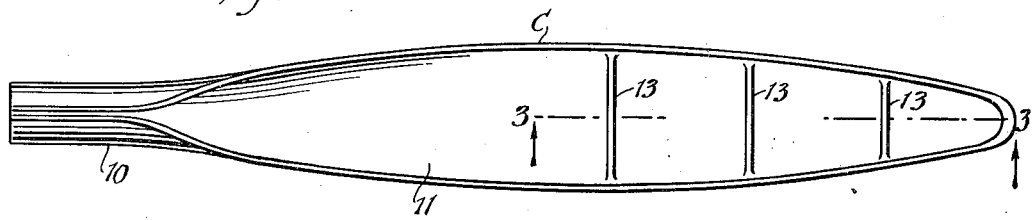

Jan. 11, 1949.  G. W. BRADY  2,458,975
RIB REINFORCING MEANS FOR PROPELLER BLADES
Filed Dec. 9, 1943

INVENTOR
George W. Brady
BY
ATTORNEY

Patented Jan. 11, 1949

2,458,975

UNITED STATES PATENT OFFICE 2,458,975

RIB REINFORCING MEANS FOR PROPELLER BLADES

George W. Brady, Upper Montclair, N. J., assignor to Curtiss-Wright Corporation, a corporation of Delaware Application December 9, 1943, Serial No. 513,573

3 Claims. (Cl. 170—159)

This invention relates to aircraft propeller blades and more particularly to hollow propeller blades which are internally reinforced.

The invention has particular reference to hollow propeller blades formed from plates disposed in facing relation and forming an interior chamber, each plate including a plurality of reinforcing rib members formed integrally therewith or suitably attached thereto, and disposed in spaced parallelism or in staggered relation, transversely of said plates.

It is known that in the operation of certain types of aircraft, for example, flying boats, seaplanes or amphibian planes, the propeller blades of such aircraft, are often struck by substantial quantities of water, as a wave, for example, during landing on or taking off from large bodies of water and more especially in rough weather. In such cases, the rear or thrust plate surfaces of revolving multi-blade propellers, upon being struck or contacted by a quantity of water, receive a blow which may be sufficient to cave-in, to some extent at least, or to otherwise damage the normal plate contour of such propeller blades.

In accordance with the present invention, therefore, the stiffness of one or both of the propeller blade forming plates is increased. As a result, stresses within the aforesaid plates are reduced. Furthermore, such increase in the stiffness of the said plates raises the natural frequency thereof, to some extent at least, probably above the range of objectionable frequencies, and this decreases the amplitude of plate vibration or deflection.

Further, with an aircraft employing hollow blades which are sealed, ascent of the aircraft to high altitudes causes the blade plates to move from each other. This effect is greatly minimized by the stiffening arrangement of my invention.

Accordingly, it is an object of the invention to provide a hollow propeller blade with a novel plate reinforcing arrangement whereby such deformation or damage to the blade forming plates is substantially prevented by increasing the stiffness of said plates and, at the same time, decreasing the amplitude of plate vibration or deflection which may be excited areodynamically or by engine pulsations.

Various other objects, advantages and features of the invention will become apparent from the following detailed description.

The invention resides in the reinforced propeller blade, combinations and arrangements of the character hereinafter described and claimed.

Figure 2:
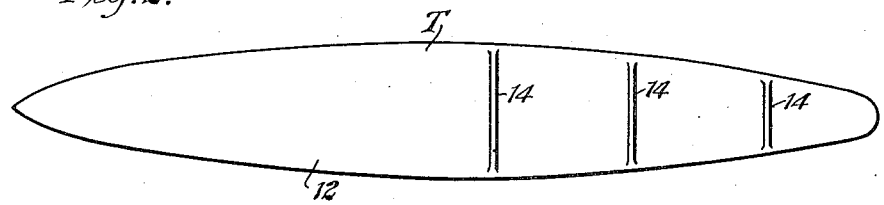
Figure 3:
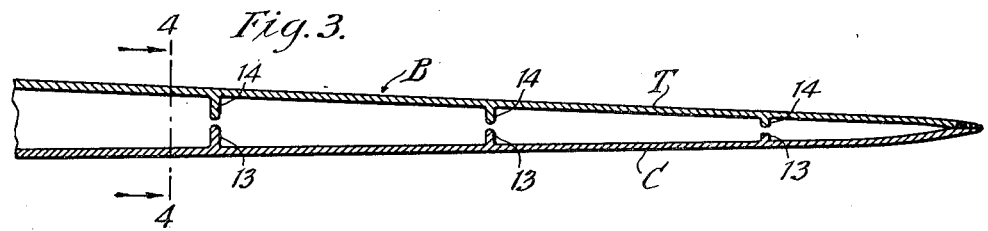
Figure 4:
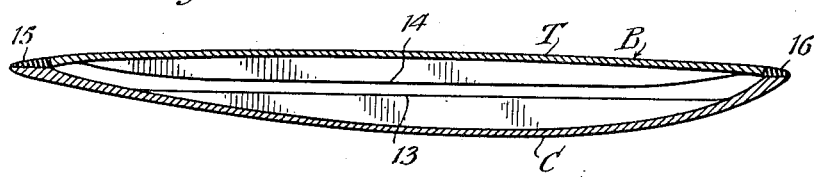
Figure 5:
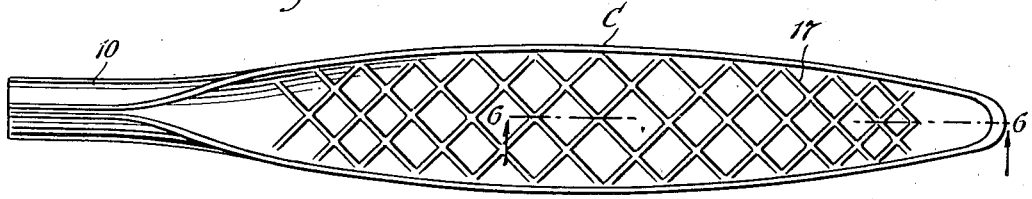
Figure 6:
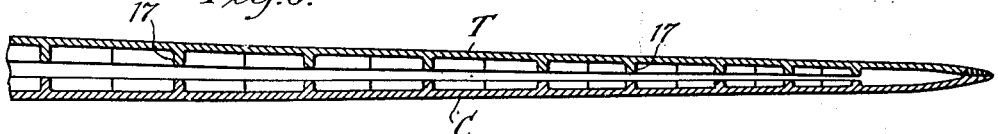
Figure 7:
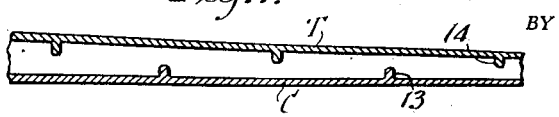

For an understanding of the invention and for an illustration of several forms thereof, reference is to be had to the accompanying drawing, in which:

Fig. 1 is a plan view illustrating a camber plate as constructed in accordance with the invention, Fig. 2 is a plan view illustrating a thrust plate as constructed in accordance with the invention, Fig. 3 is a longitudinal sectional view taken on the line 3—3 of Fig. 1, Fig. 4 is a transverse sectional view taken on the line 4—4 of Fig. 3, Fig. 5 is a plan view illustrating a camber plate as constructed in accordance with a modified form of the invention, Fig. 6 is a longitudinal sectional view taken on the line 6—6 of Fig. 5, and Fig. 7 is a fragmentary sectional view illustrating another modified form of the invention.

Referring to Figs. 1 through 5, I have shown a metallic camber plate C and a metallic thrust plate T utilizable for forming a hollow propeller blade B. As illustrated, the camber plate C comprises a tubular shank 10 having extended therefrom the plate 11 which, generally, is of convex configuration, the convexity decreasing in a progressive manner as the end of the plate 11 is approached, said camber plate C defining a shallow opening of generally ellipical configuration. The thrust plate T comprises a plate 12 which generally is also of elliptical configuration corresponding with the aforesaid shallow opening of the camber plate C, and, as will be noted, the thrust plate T does not include a shank portion as does the camber plate C.

As illustrated, the plates C and T include the respective transversely extending plate reinforcing ribs 13 and 14 which, when said plates are assembled, are preferably although not necessarily disposed substantially in spaced, facing relation or in a common plane.

As illustrated in Figs. 1 and 2, a plurality of the ribs 13 and 14 are disposed in any desired spaced relation transversely or cross-wise of the camber and thrust plates C and T respectively. As shown, said ribs 13 and 14 are equally spaced between the blade tip and the blade midsection approximately but this may be varied as desired. Under certain circumstances, it may be desirable to stagger the ribs on one plate with respect to the ribs on the other plate, as shown in Fig. 7, without departing from the spirit of the invention. The plate reinforcing ribs 13 and 14 may be formed integrally with the aforesaid plates as by a forging or suitable milling operation, or, they may be welded or otherwise secured to the interior surface of said camber and thrust plates C and T.

Referring to Figs. 3 and 4, it is to be observed that in the example where the ribs 13 and 14 are welded or otherwise secured to the plates C and T, one edge face of each of the aforesaid ribs is shaped to conform to the contour of the respective plates while the opposite or free edge face, remains substantially straight. The opposite ends of each rib 13 and 14 taper off to a point or substantially so and extend across the blade forming plates to a point short of or adjacent the welded plate edges 15 and 16 forming the leading and trailing edges respectively of the blade B as clearly shown in Fig. 4.

In Fig. 5, a camber plate C comprising the tubular shank 10 having extended therefrom the plate portion 11 is shown, by way of example, with a modified form of plate reinforcement 17 which may follow the pattern of a waffle iron grid, diamond grid or similar configuration and which may be integral with the plate or separately formed and welded or otherwise secured thereto. The aforesaid plate reinforcement grid 17 may extend substantially throughout the blade forming area of each plate C and T or in some predetermined local area thereon as will be understood by those skilled in the art.

When the ribs 13 and 14 are disposed in facing sets, the distance between sets of facing surfaces may be uniform or non-uniform as desired. Thus, the ribs 13 and 14 may be of constant height whereby the space between each set of the ribs 13 and 14 will follow the taper of the blade B and gradually increase from the tip toward the shank portion thereof. On the other hand, the height of each set of the ribs 13 and 14 may increase from the tip of the blade toward the shank, as shown in Fig. 3, whereby the spacing between the respective plate ribs 13 and 14 remains uniform. The same condition may apply to the modified example shown in Figs. 5 and 6.

It shall be understood that my invention is applicable to various forms or types of hollow blades and that it is not to be restricted to a propeller blade formed from two plates. Thus, the "plate components" referred to in the claims may be formed from a single piece of material suitably shaped to form a propeller blade. Alternatively, four or more plate components may be utilized as desired to form the propeller blade.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A hollow metallic propeller blade comprising a pair of plates comprising flattened thrust and camber members disposed in facing relation and defining an interior chamber, and a reinforcing rib integral with one of said plates and extending into said chamber from the inner side only of said plate, said reinforcing rib being uninterrupted and disposed crosswise with respect to the longitudinal axis of said propeller blade and extending from a point adjacent the blade trailing edge to a point adjacent the blade leading edge, the surface of said reinforcing rib which faces the other plate being spaced from the interior surface thereof.

2. A hollow metallic propeller blade comprising a pair of plates comprising flattened thrust and camber members disposed in facing relation and defining an interior chamber, and spaced reinforcing ribs integral with one of said plates and extending into said chamber from the inner side only of said plate, said reinforcing ribs being uninterrupted and disposed substantially at right angles with respect to the longitudinal axis of said propeller blade and extending from a point adjacent the blade trailing edge to a point adjacent the blade leading edge, the surfaces of the respective reinforcing ribs which face the other plate being spaced from the interior surface thereof.

3. A hollow metallic propeller blade comprising a pair of plates comprising flattened thrust and camber members disposed in facing relation and defining an interior chamber, and a plurality of spaced reinforcing ribs extending into said chamber from each of said plates from the inner side only thereof, said reinforcing ribs being uninterrupted and disposed crosswise with respect to the longitudinal axis of said propeller blade and extending from a point adjacent the blade trailing edge to a point adjacent the blade leading edge, said ribs being arranged as sets, each set comprising a rib on the thrust member and a rib on the camber member, the two ribs of each set of ribs facing each other in spaced relation.

GEORGE W. BRADY.

REFERENCES CITED

The following references are of record in the file of this patent:

UNITED STATES PATENTS

| Number | Name | Date |
|--------|------|------|
| 1,488,894 | Porter | Apr. 1, 1924 |
| 1,635,840 | Haw | July 12, 1927 |
| 1,843,206 | Coffman | Feb. 2, 1932 |
| 1,999,136 | Cierva | Apr. 23, 1935 |
| 2,170,865 | Lampton | Aug. 29, 1939 |
| 2,231,888 | Couch | Feb. 18, 1941 |

FOREIGN PATENTS

| Number | Country | Date |
|--------|---------|------|
| 215,130 | Great Britain | May 8, 1924 |
| 215,156 | Great Britain | May 8, 1924 |